United States Patent
Sasaki

[11] Patent Number: 5,946,974
[45] Date of Patent: Sep. 7, 1999

[54] BALL SCREW MECHANISM

[75] Inventor: Akira Sasaki, Tokyo, Japan

[73] Assignee: Kabushiki Kaisha Toshiba, Kawasaki, Japan

[21] Appl. No.: 09/046,788

[22] Filed: Mar. 24, 1998

[30] Foreign Application Priority Data

Mar. 27, 1997 [JP] Japan .................................. 9-075188

[51] Int. Cl.$^6$ .................................................. F16B 2/16
[52] U.S. Cl. ........................ 74/459; 74/89.15; 74/424.8 R
[58] Field of Search ............................... 74/459, 89.15, 74/424.8 R

[56] References Cited

U.S. PATENT DOCUMENTS

| | | | |
|---|---|---|---|
| 4,680,982 | 7/1987 | Wilke et al. | 74/424.8 R |
| 5,239,882 | 8/1993 | Druet | 74/424.8 R |
| 5,622,082 | 4/1997 | Machelski | 74/459 |
| 5,749,265 | 5/1998 | Namimatsv et al. | 74/459 |
| 5,749,266 | 5/1998 | Tsukada | 74/459 |
| 5,782,135 | 7/1998 | Kondo et al. | 74/459 |
| 5,809,838 | 9/1998 | Miyaguchi et al. | 74/459 |

*Primary Examiner*—John A. Jeffery
*Assistant Examiner*—David Fenstermacher
*Attorney, Agent, or Firm*—Oblon, Spivak, McClelland, Maier & Neustadt, P.C.

[57] ABSTRACT

A screw shaft, a nut, and a conduit member are made of metal material, and a solid lubrication film is coated on inner walls of thread grooves thereof and a ball circulation path of the conduit member. Where d1 is the inner diameter of the ball circulation path of the conduit member, d2 is the groove diameter of the screw shaft, d3 is the diameter of each ball, and h1 is a clearance between the screw shaft and the end portion of the thread groove (as well as the end portion of the conduit member), respective members are arranged so as to satisfy relations of $(|d1-d2|/d3) \leq 1/40$ and $h1/h3 \leq 1/40$. As a result, it is possible to provide a ball screw mechanism in which film-transfer lubrication is achieved between the members and the durability and precision are improved.

6 Claims, 2 Drawing Sheets

BALL SCREW MECHANISM

BACKGROUND OF THE INVENTION

The present invention relates to a ball screw mechanism preferable for use in an extreme environment such as space, vacuum environment, or the like. More specifically, the present invention relates to a ball screw mechanism using a solid lubrication film with high precision.

As is known, space is a thermal vacuum environment and it is difficult to make fluid lubrication with use of oil or grease. Therefore, ball screw mechanisms forming part of various drive mechanisms and the like assembled in an aerospace vehicle adopt a solid lubrication system using a solid lubricant such as molybdenum disulfide or the like.

A known solid lubrication system is a method has in which solid lubrication films are formed on a ball, a screw shaft, and a thread groove of a nut by sputtering, plating, or coating.

In this kind of ball screw mechanism, a conduit member called a bypass member having a ball circulation path for sliding guide of balls is assembled and provided between both end portions of a thread groove of a nut and a bypass circuit is thereby formed so as to communicate the both end portions of the thread groove. As a result, when the screw shaft is driven to rotate, the screw shaft is driven to rotate in relation to the nut by an action of balls. The balls interposed between the thread groove of the screw shaft and the nut are circulated and moved through the ball circulation path of the conduit member, spiral engagement between the screw shaft and the nut is adjusted so that the nut is guided in an axial direction.

However, in a ball screw mechanism of the solid lubrication system described above, it is difficult to expect a damping effect from a solid lubricant inserted between members which are in contact with each other. Consequently, vibration or noise may be incurred when balls circulate if positional dislocation occurs at a gap between a thread groove of a nut, a ball circulation path of a conduit member, and a thread groove of a screw shaft. Thus, a ball screw mechanism or the like of a solid lubrication system generally has a problem of difficulties in drive control with high precision.

Also as described above, if the circulation path of balls includes positional dislocation of a predetermined value or more, fatigue and abrasion proceed and lead to shortened lifetime because of vibration and impact caused when balls circulate. As a result, it is difficult to satisfy requirements for use in a space environment which demands for long lifetime.

In order to solve problems described above, it may be considered that an above-mentioned ball screw mechanism used, for example, in space should be processed and manufactured with high precision which will hardly incur positional displacement of gaps or the like of a nut, conduit member, and screw so that vibration and noise can be reduced.

However, since there are boundaries of improvements in processing precision, a problem lies in that the manufacturing and processing of such a mechanism is very complicated. Further, even if a nut or a conduit member can be processed with high precision, the precision of the entire ball screw mechanism may be restricted by the precision of a solid lubrication film coated on the surfaces of the nut and conduit member. Specifically, at present, there are boundaries of improvements in precision of a thickness and the like of a solid lubrication film coated on those members. Therefore, precision of dimensions of those members and dimensions relative to balls are restricted by precision of a thickness and the like of the solid lubrication film, and this restriction limits precision of the entire ball screw mechanism.

In addition, the thickness of a solid lubrication film may change or a part thereof may be broken due to abrasion during use. In this case, a clearance between members in contact with each other is greatly changed. The precision of a ball screw mechanism is thus limited by a time-based factor.

The above-described situation is not limited to a space environment but is common to an extreme environment such as a vacuum environment on earth. In general, a ball screw mechanism using a conventional solid lubrication film are subjected to restrictions concerning improvements in precision as described above and attains only short lifetime. It is therefore difficult for such a ball screw mechanism to satisfy specification requirements from an extreme environment such as a space environment or the like where maintenance services or inspection services are difficult.

BRIEF SUMMARY OF THE INVENTION

The present invention has been made in view of the above situation and has an object of providing a ball screw mechanism which attains improved long lifetime by realizing stable operation over a long period and besides realizes simple manufacturing and processing.

In the present invention, dimensions of a clearance between members of a ball screw mechanism are limited so that a film-transfer lubrication is caused between the members by a lubricant of a solid lubrication film, thereby to achieve the object described above. The film-transfer lubrication is a phenomenon that a part of a solid lubricant of a solid lubrication film is transferred onto a surface of a member to be lubricated or a solid lubrication film coated on the surface thereby making a lubrication effect. Further, the precision of a clearance between members which is necessary for stably making film-transfer lubrication differs between the types of the structures of various ball screw mechanisms as follows.

According to a first aspect of the invention, a ball screw mechanism comprises: a screw shaft; a nut screwed on the screw shaft with balls interposed therebetween; and a conduit member forming a ball circulation path by which both end portions of a thread groove of the nut are made communicate with each other, thereby to circulate the balls in the thread groove of the nut by the conduit member, wherein the balls, the screw shaft, the nut, and the conduit member are made of metal material, a ball slide section formed by the screw shaft and the nut is coated with a solid lubrication film, and relations of $(|d1-d2|/d3) \leq 1/40$ and $h1/d3 \leq 1/40$ are satisfied where d1 is an inner diameter of the conduit member, d2 is a diameter of a thread groove of the screw shaft, d3 is a diameter of each of the balls, and h1 is a clearance from the screw shaft to the thread groove of the nut and an end portion of the conduit member.

In the above-described structure, the balls are moved and circulate, passing through the ball circulation path of the conduit member assembled and provided with predetermined precision with respect to the thread groove of the nut, and guided by the nut groove of the nut. The balls are thereby brought into contact with the solid lubrication film of the thread groove of the screw shaft and the ball slide section of the nut, so that the solid lubrication film is transferred onto the surfaces of the balls. Thus, film-transfer lubrication is achieved.

In this film-transfer lubrication, the solid lubricant is transferred between surfaces of members, and therefore, a stable solid lubrication film is constantly provided and maintained between contact surfaces of balls and members which are in contact with each other. Accordingly, the balls are moved and circulate through the thread groove of the screw shaft as well as the thread groove of the nut and the ball circulation path of the conduit member which are assembled with a predetermined clearance h1 maintained therebetween. Therefore, vibration and noise during circulation movement are maintained within a tolerable range, and besides, fatigue and abrasion of the solid lubrication film are reduced, so that stable circulation of balls is realized for a long time period and the lifetime is improved. As a result of this, ball circulation with high precision can be realized for a long time period by manufacturing a ball screw mechanism with the clearance h1 maintained within a tolerable range of manufacturing precision, and simplified manufacture is ensured.

According to a second aspect of the present invention, a ball screw mechanism comprising: a screw shaft; a nut screwed on the screw shaft with balls interposed therebetween; and a ball circulation bridge provided with a plurality of communication grooves forming a ball circulation path by which portions of a thread groove of the nut are made communicate with each other, thereby to circulate the balls in the thread groove of the nut by a communication groove of the ball circulation bridge, wherein the balls, the screw shaft, the nut, and the ball circulation bridge are made of metal material, a ball slide section formed by the screw shaft and the nut is coated with a solid lubrication film, and relations of $(|d4-d2|/d3) \leq 1/40$ and $h2/d3 \leq 1/40$ are satisfied where d2 is a diameter of a thread groove of the screw shaft, d3 is a diameter of each of the balls, d4 is an inner diameter of the communication groove of the ball circulation bridge, and h2 is a clearance from the screw shaft to the thread groove of the nut and an end portion of the communication groove of the ball circulation bridge.

In the above-described structure, the balls are moved and circulate, passing through the ball circulation path of the circulation bridge assembled and provided with predetermined precision with respect to the thread groove of the nut, and are brought into contact with the solid lubrication film of the ball slide section of the screw shaft and the ball slide section of the nut, so that the solid lubrication film is transferred onto the surfaces of the balls. Thus, film-transfer lubrication is achieved. Accordingly, the balls are moved and circulate through the thread groove of the screw shaft as well as the thread groove of the nut and the communication groove of the ball circulation bridge which are assembled with a predetermined clearance h2 maintained therebetween. Therefore, vibration and noise during circulation movement are maintained within a tolerable range, and besides, fatigue and abrasion of the solid lubrication film are reduced, so that stable circulation of the balls is realized for a long time period and the lifetime is improved. As a result of this, ball circulation with high precision can be realized for a long time period by manufacturing a ball screw mechanism with the clearance h2 maintained within a tolerable range of manufacturing precision, and simplified manufacture is ensured.

Further, according to a third aspect of the present invention, a ball screw mechanism comprises: a screw shaft; a nut screwed on the screw shaft with balls interposed therebetween; and a ball circulation member having a ball circulation path by which both end portions of a thread groove of the nut are made communicate with each other, thereby to circulate the balls in the thread groove of the nut by the ball circulation path of the ball circulation member, wherein the balls, the screw shaft, the nut, and the ball circulation member are made of metal material, a ball slide section formed by the screw shaft and the nut is coated with a solid lubrication film, and relations of $(|d6-d5|/d3) \leq 1/40$, $(|d5-d2|/d3) \leq 1/40$, and $h3/d3 \leq 1/40$ are satisfied where d2 is a diameter of a thread groove of the screw shaft, d3 is a diameter of each of the balls, d5 is an inner diameter of the thread groove of the nut, d6 is an inner diameter of the ball circulation path of the ball circulation member, and h1 is a clearance from the thread groove of the screw shaft to the nut and inlet and outlet ports of the ball circulation path of the ball circulation member.

In the above-described structure, the balls are moved and circulate, passing through the ball circulation path of the ball circulation member assembled and provided with predetermined precision with respect to the thread groove of the nut, and are brought into contact with the solid lubrication film of the ball slide section of the screw shaft and the ball slide section of the nut, so that the solid lubrication film is transferred onto the surfaces of the balls. Thus, film-transfer lubrication is achieved. Accordingly, the balls are moved and circulate through the thread groove of the screw shaft as well as the thread groove of the nut and the ball circulation path of the ball circulation member which are assembled with a predetermined clearance h3 maintained therebetween. Therefore, vibration and noise during circulation movement are maintained within a tolerable range, and besides, fatigue and abrasion of the solid lubrication film are reduced, so that stable circulation of the balls is realized for a long time period and the lifetime is improved. As a result of this, ball circulation with high precision can be realized for a long time period by manufacturing a ball screw mechanism with the clearance h3 maintained within a tolerable range of manufacturing precision, and simplified manufacture is ensured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, embodiments of the present invention will be specifically explained with reference to the drawings.

Figure 1:
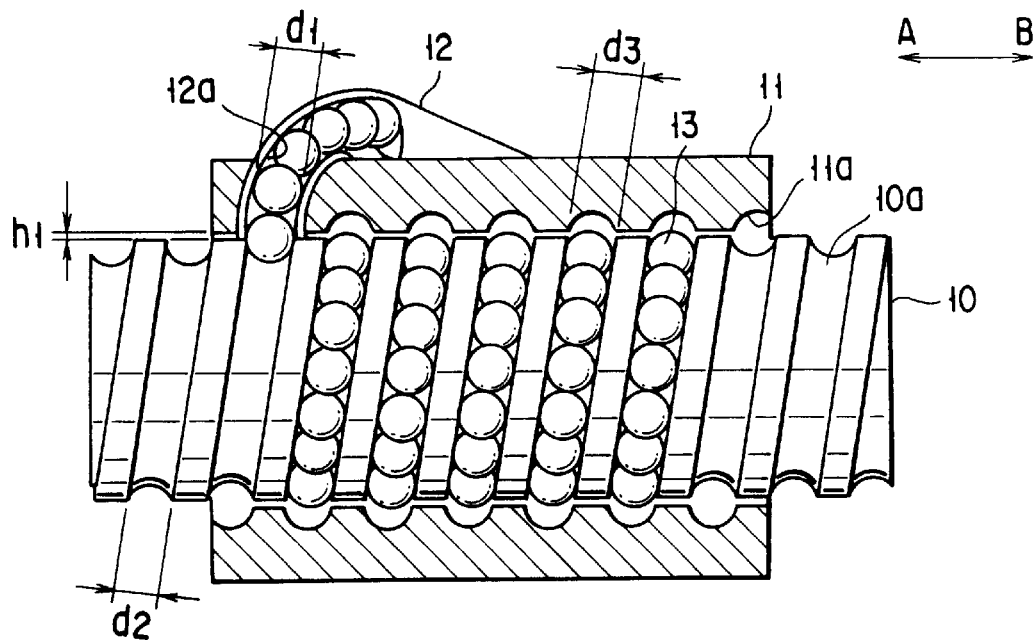
FIG. 1 is a longitudinal cross-sectional view showing a ball screw mechanism according to a first embodiment of the present invention.

FIG. 1 shows a ball screw mechanism according to a first embodiment of the present invention. A screw shaft 10 is connected with, for example, a drive source not shown and the circumference of the screw shaft is spirally engaged with a nut 11 connected to a target section to be driven.

Specifically, the screw shaft 10 and the nut 11 are made of metal material, and a ball slide section including a thread groove 10a of the screw shaft 10 and a thread screw 11a of the nut 11 is subjected to coating process such as molybdenum disulfide coating process or the like and is thereby coated with a solid lubrication film. A tubular conduit member 12 forming a bypass circuit is bridged between both end portions of the thread groove 11a of the nut 11 such that both end portions communicate with each other. The conduit member 12 is made of metal material, and the inner wall of a ball circulation path 12a of the conduit member 12 is subjected to coating process such as molybdenum disulfide coating process or the like and is thereby coated with a solid lubrication film.

Between the screw shaft 10 and the nut 11, a plurality of balls 13 are inserted such that the balls freely circulate and move through the conduit member 12. The balls 13 circulate and move through the ball circulation path 12a of the conduit member 12 and between the thread groove 10a of the screw shaft 10 and the thread groove 11a of the nut 11, so that adjustment can be allowed for spiral engagement between the nut 11 and the screw shaft 10. In this respect, the balls 13 are lubricated by portions of the solid lubrication film transferred from the solid lubrication film of the screw shaft 10, nut 11, and bypass member 12 as the balls 13 circulate and move.

The screw shaft 10, nut 11, and conduit member 12 are formed so as to satisfy relations described below, where d1 is the inner diameter of the ball circulation path 12a of the conduit member 12, d2 is the diameter of the groove of the screw shaft 10, d3 is the diameter of the ball 13, and h1 is a clearance between the screw shaft 10 and the end portion of the thread groove 11a of the nut 11 (as well as the end portions of the conduit member 12).

$$(|d1-d2|/d3) \leq 1/40 \quad (1)$$

$$h1/d3 \leq 1/40 \quad (2)$$

In the structure described above, when a torque from the drive source (not shown) is transmitted to the screw shaft and the screw shaft 10 is driven to rotate, the nut 11 is driven to rotate in relation to the screw shaft through the balls 13 and moves linearly in directions indicated by arrows A and B. Then, the balls 13 interposed between the thread groove 10a of the nut 11 and the thread groove 11a of the nut 11 are circulated and moved through the conduit member 12, so that spiral engagement between the screw shaft 10 and the nut 11 is adjusted thereby guiding the nut 11 in the axial direction. While the balls 13 move between the thread groove 10a of the screw shaft 10 and the thread groove 11a of the nut 11, which are combined together in compliance with the relations (1) and (2) described above and through the ball circulation path 12a of the conduit, the solid lubrication film coated on the screw shaft 10, nut 11, and conduit member 12 is transferred onto oxalate films on the surfaces of the balls 13.

Thus, in the ball screw mechanism, the screw shaft 10, nut 11, and conduit member 12 are made of metal material, and solid lubrication films are coated on inner walls of the thread grooves 10a and 11a and the ball circulation path 12a. The screw shaft 10, nut 11, and the ball circulation path 12a of the conduit member 12 are assembled and arranged so as to satisfy the relations (1) and (2) described above.

According to the structure as described above, when the screw shaft 10 is driven to rotate, the surfaces of the balls 13 are brought into contact with the solid lubrication films on the screw shaft 10, nut 11, and conduit member 12 which are assembled and arranged with a predetermined clearance h1 maintained therebetween, and the solid lubrication films of the screw shaft 10, nut 11, and the conduit member 12 are transferred onto the surfaces of the balls, thereby making film-transfer lubrication. As a result of this, it is possible to ensure easy manufacturing and processing achieved by slight improvements of processing precision, and besides, vibration and noise during circulation of balls can be reduced to desired values. Fatigue and abrasion can also be reduced and stable film-transfer lubrication can be realized. Accordingly, stable operation can be realized for a long period.

In the above embodiment, explanation has been made a structure in which a torque from a drive source is transmitted to the screw shaft 10. However, the present invention is not limited to this structure, but the embodiment may be arranged such that a torque is applied to the nut 11 and the screw shaft 10 is moved in the axial direction in association with rotation of the nut 11, for example.

Also, in the embodiment described above, explanation has been made of a structure in which a solid lubrication film is formed on the inner wall of the ball sliding section including the thread groove 10a of the screw shaft 10, the inner wall of the ball sliding section including the thread groove 11a of the nut 11, and the inner wall of the ball circulation path 12a of the conduit member 12. However, the present invention is not limited hitherto, but film-transfer lubrication may be achieved by forming a solid lubrication film only on the ball sliding section of the screw shaft 10 and the ball sliding section of the nut 11 without forming a solid lubrication film on the ball lubrication path of the conduit member 12, for example.

Further, in the above embodiment, the bypass structure has been explained as using a tubular conduit member 12. However, the present invention is not limited hitherto, but various bypass structures are applicable, such as a bridge-type structure shown in FIG. 2, a return-plate type structure shown in FIG. 3, and the like. From any of the bypass structures, the same advantages as obtained in the above embodiment can be expected.

Figure 2:
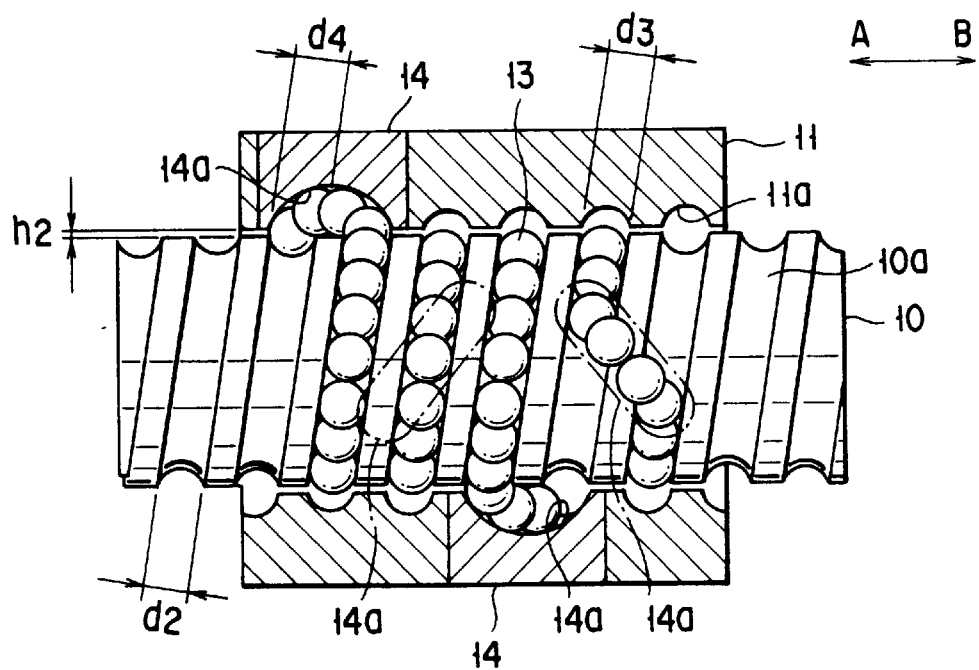
FIG. 2 is a longitudinal cross-sectional view according to a second embodiment of the present invention.

FIG. 2 shows a second embodiment of a ball screw mechanism using another type of structure called a bridge-type structure. In this structure, a ball circulation bridge 14 is assembled and provided at an intermediate portion of a nut 11. A communication groove 14a by which different portions of a thread groove 11a of the nut 11 communicate with each other is formed in the ball circulation bridge 14, and balls 13 contained in the thread groove 11a of the nut 11 are circulated between different portions of the thread groove 11a through the communication groove 14a.

In addition, the ball sliding section including the thread grooves 10a and 11a of the screw shaft 10 and nut 11, as well as a communication groove 14a of the ball circulation bridge 14, are coated with solid lubrication films in the substantially same manner as in FIG. 1, for example. Further, the screw groove 10, nut 11, and ball circulation bridge 14 are assembled and arranged so as to satisfy relations described below, where d2 is the diameter of the thread groove 10a of the screw shaft 10, d3 is the diameter of the ball, d4 is the inner diameter of the communication groove 14a of the ball circulation bridge 14, and h2 is a clearance between the screw shaft 10 and the end portion of the thread groove 11a as well as the end portions of the communication groove 14a of the ball circulation bridge 14.

$$(|d4-d2|/d3) \leq 1/40$$

$$h2/d3 \leq 1/40$$

In the mechanism according to the second embodiment, stable film-transfer lubrication is obtained between the balls 13 and the members having contact with the balls, like in the mechanism having the structure shown in FIG. 1, and the same advantages as those of the mechanism shown in FIG. 1 can be achieved.

Figure 3:
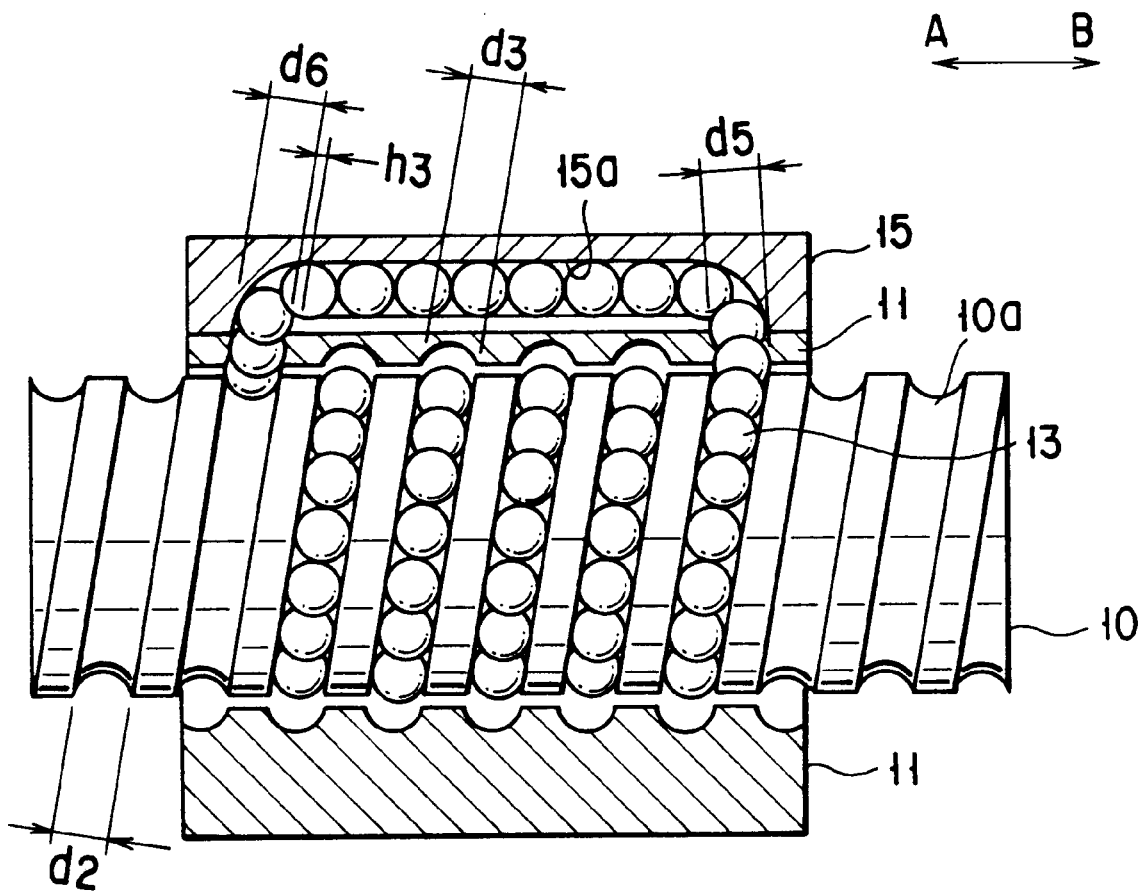
FIG. 3 is a longitudinal cross-sectional view according to the second embodiment of the present invention.

FIG. 3 shows a third embodiment of a ball screw mechanism adopting further another type of structure called a return-plate type structure. In this mechanism, the nut 11 is provided and assembled with a ball circulation member 15 forming a ball circulation path 15a by which both end portions of a thread groove 11a of a nut 11 communicate with each other. The ball circulation member 15 is made of metal material, and both ends of the thread groove 11a of the nut 11 communicate with each other by the ball circulation path 15a, for example, in association with rotation of the screw shaft 10, so that balls 13 are circulated through the thread groove 11a.

A ball sliding section including the thread grooves 10a and 11a of the screw shaft 10 and nut 11, as well as the ball circulation path 15a of the ball circulation member 15 are coated with solid lubrication films, for example, like in FIG. 1. These members are assembled and arranged so as to satisfy relations described below, where d2 is the groove diameter of the thread groove 10a of the screw shaft 10, d3 is the diameter of ball 13, d5 is the groove diameter of the thread groove 11a of the nut 11, d6 is the inner diameter of the ball circulation path 15a of the ball circulation member 15, and h3 is a clearance between the thread groove 10a of the screw shaft 10 and the nut 11 as well as inlet and outlet ports of the ball circulation path 15a of the ball circulation member 15.

$$(|d6-d5|/d3) \leq 1/40$$

$$(|d5-d2|/d3) \leq 1/40$$

$$h3/d3 < 1/40$$

In the mechanism according to the third embodiment, stable film-transfer lubrication is obtained between the balls 13 and the members having contact with the balls, like in the mechanism having the structure shown in FIG. 1, and the same advantages as those of the mechanism shown in FIG. 1 can be achieved.

The ball screw mechanisms shown in FIGS. 2 and 3 are arranged such that the communication groove 14a of the ball circulation bridge 14 and the ball circulation path 15a of the ball circulation member 15 are coated with solid lubrication films. However, the present invention is not limited hitherto, and substantially same advantages can be expected if only a solid lubrication film is formed at least on the ball sliding section including the thread grooves 10a and 11a of the screw shaft 10 and nut 11.

Thus, the present invention is not limited to the embodiments as described above but can naturally be modified variously in practice within the scope of the subject matter of the invention.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A ball screw mechanism comprising:

a screw shaft;

a nut screwed on the screw shaft with balls interposed therebetween; and a conduit member forming a ball circulation path by which both end portions of a thread groove of the nut are made communicate with each other, thereby to circulate the balls in the thread groove of the nut by the conduit member, wherein the balls, the screw shaft, the nut, and the conduit member are made of metal material, a ball slide section formed by the screw shaft and the nut is coated with a solid lubrication film, and relations of $(|d1-d2|/d3) \leq 1/40$ and $h1/d3 \leq 1/40$ are satisfied where d1 is an inner diameter of the conduit member, d2 is a diameter of a thread groove of the screw shaft, d3 is a diameter of each of the balls, and h1 is a clearance between the screw shaft and the thread groove of the nut as well as end portions of the conduit member.

2. A ball screw mechanism according to claim 1, wherein the ball circulation path of the conduit member is coated with a solid lubrication film.

3. A ball screw mechanism comprising:

a screw shaft;

a nut screwed on the screw shaft with balls interposed therebetween; and a ball circulation bridge provided with a plurality of communication grooves forming a ball circulation path by which portions of a thread groove of the nut are made communicate with each other, thereby to circulate the balls in the thread groove of the nut by a communication groove of the ball circulation bridge, wherein the balls, the screw shaft, the nut, and the ball circulation bridge are made of metal material, a ball slide section formed by the screw shaft and the nut is coated with a solid lubrication film, and relations of $(|d4-d2|/d3) \leq 1/40$ and $h2/d3 \leq 1/40$ are satisfied where d2 is a diameter of a thread groove of the screw shaft, d3 is a diameter of each of the balls, d4 is an inner diameter of the communication groove of the ball circulation bridge, and h2 is a clearance between the screw shaft and the thread groove of the nut as well as end portions of the communication groove of the ball circulation bridge.

4. A ball screw mechanism according to claim 3, wherein the communication groove of the ball circulation bridge is coated with a solid lubrication film.

5. A ball screw mechanism comprising:

a screw shaft;

a nut screwed on the screw shaft with balls interposed therebetween; and a ball circulation member having a ball circulation path by which both end portions of a thread groove of the nut are made communicate with each other, thereby to circulate the balls in the thread groove of the nut by the ball circulation path of the ball circulation member, wherein the balls, the screw shaft, the nut, and the ball circulation member are made of metal material, a ball slide section formed by the screw shaft and the nut is coated with a solid lubrication film, and relations of $(|d6-d5|/d3) \leq 1/40$, $(|d5-d2|/d3) \leq 1/40$, and $h3/d3 \leq 1/40$ are satisfied where d2 is a diameter of a thread groove of the screw shaft, d3 is a diameter of each of the balls, d5 is an inner diameter of the thread groove of the nut, d6 is an inner diameter of the ball circulation path of the ball circulation member, and h1 is a clearance between the screw shaft and the thread groove of the nut as well as inlet and outlet ports of the ball circulation path of the ball circulation member.

6. A ball screw mechanism according to claim 5, wherein that the ball circulation path of the ball circulation member is coated with a solid lubrication film.

* * * * *